United States Patent [19]
Yang

[11] Patent Number: 6,101,427
[45] Date of Patent: Aug. 8, 2000

[54] AUTOMATIC LUBRICATING OIL FEEDING SYSTEM CAPABLE OF CENTRALIZED CONTROL VIA RADIO LINK

[76] Inventor: Yun Jong Yang, 411-063, 4 danji, 904 Mok-dong, Yangcheon-ku, Seoul, Rep. of Korea

[21] Appl. No.: 09/057,257

[22] Filed: Apr. 8, 1998

[30] Foreign Application Priority Data

Feb. 2, 1998 [KR] Rep. of Korea .................. 98-2794

[51] Int. Cl.⁷ .................................................. G06F 17/00
[52] U.S. Cl. .................... 700/241; 700/244; 700/236; 700/239
[58] Field of Search .................. 364/479.11, 479.12, 364/479.07, 479.14, 479.01; 395/200.33, 200.3; 340/825.34, 825.35; 345/335; 184/6.4; 700/241, 244, 236, 239

[56] References Cited

U.S. PATENT DOCUMENTS

| | | |
|---|---|---|
| 4,445,168 | 4/1984 | Petryszyn . |
| 5,019,198 | 5/1991 | Oshita et al. ........................ 364/424.05 |
| 5,100,699 | 3/1992 | Roeser ..................................... 427/256 |
| 5,154,314 | 10/1992 | Van Wormer .............................. 222/1 |
| 5,381,874 | 1/1995 | Hadank et al. . |
| 5,446,453 | 8/1995 | Nagamoto et al. ................ 340/825.06 |
| 5,528,499 | 6/1996 | Hagenbuch ......................... 364/424.07 |
| 5,612,890 | 3/1997 | Strasser et al. ..................... 364/479.11 |
| 5,648,898 | 7/1997 | Moore-McKee et al. ............. 364/191 |
| 5,742,198 | 4/1998 | Horie et al. .............................. 327/551 |
| 5,788,012 | 8/1998 | Yang ........................................ 184/6.4 |
| 5,917,405 | 6/1999 | Joao ....................................... 340/426 |

FOREIGN PATENT DOCUMENTS

| | | |
|---|---|---|
| 0-374-958 A2 | 6/1990 | European Pat. Off. . |
| 0-489-603 A2 | 6/1992 | European Pat. Off. . |
| 0-728-984 A1 | 8/1996 | European Pat. Off. . |
| 2081820 | 2/1982 | United Kingdom . |

*Primary Examiner*—Christopher P. Ellis
*Assistant Examiner*—Michael E. Butler
*Attorney, Agent, or Firm*—Wallenstein & Wagner, Ltd.

[57] ABSTRACT

An automatic lubricating oil feeding system is disclosed which can centralistically control a plurality of dependent terminals to feed lubricating oil to required machine elements, such as bearings, at proper times by receiving the operation state information from the respective terminals. The system includes a host controller which utilizes a personal computer programmed to supervise, check, and display terminal state information, and an RF section, coupled to the personal computer via an interface, for transmitting command data of the personal computer and receiving the terminal state information data through a radio communication network. The system further includes at least one terminal comprising a lubricating oil discharge control device having a mechanical unit for discharging lubricating oil, a microprocessor for controlling the operation of the mechanical unit, and an RF section, coupled to the lubricating oil discharge control device, for receiving from the host controller the command data for controlling the lubricating oil discharge control device and transmitting to the host controller the terminal state information data resulting from a self-test of the lubricating oil discharge control device through the radio communication network.

6 Claims, 5 Drawing Sheets

AUTOMATIC LUBRICATING OIL FEEDING SYSTEM CAPABLE OF CENTRALIZED CONTROL VIA RADIO LINK

BACKGROUND OF THE INVENTION

1. Field of the Invention

The present invention relates to a system for automatically feeding lubricating oil to bearing parts of various machine elements. In particular, the present invention relates to an automatic lubricating oil feeding system which can centralistically control a plurality of dependent terminals to feed lubricating oil to required parts at proper times, respectively, by receiving the operation state information from the respective terminals as a central controller.

2. Description of the Related Art

In order to achieve an automatic lubricating oil feeding to machine elements such as bearings of various industrial equipments, diverse kinds of lubricating oil feeding apparatuses have been developed and used.

One among such conventional apparatuses is a spring type lubricating oil feeding apparatus in which a spring is simply installed in a housing containing lubricating oil and which presses and discharges the oil by the elasticity of the spring. Another one is an electric lubricating oil feeding apparatus which expands gas in a gas chamber utilizing an electric signal and presses and discharges the oil by the expanded gas.

The former feeds the oil only by the spring force and thus an accurate feeding operation cannot be effected. Further, since the residual quantity of oil in the apparatus cannot be ascertained, the proper management of the oil feeding and the timely replacement of the apparatus cannot be achieved.

The latter has the advantage that determination of various lubricating oil feeding modes can be possible. However, when a plurality of lubricating oil feeding apparatuses are installed on a plurality of machine elements, respectively, separate maintenance and management for the respective apparatuses is required. The operating states the respective apparatuses are in, cannot be defined.

In general, the above-described conventional apparatuses have the advantage that they can continuously feed the lubricating oil to the required machine elements. However, since the feeding of the oil is performed by the apparatus for a long time in the range of several month to several years, and a large number of apparatuses are installed on the required machine elements, respectively, a great deal of management is required in patrolling and checking all the apparatuses one by one. If the apparatuses are left in an abnormal oil feeding state or to vanish completely due to the negligence of management, it causes the machine elements to be damaged.

SUMMARY OF THE INVENTION

It is an objective of the present invention to solve the problems involved in the related art, by providing an automatic lubricating oil feeding system which can centralistically control a plurality of terminals having lubricating oil feeding units, respectively, by providing a radio communication network between a host controller as a central controller and the terminals as subscribers, supervising the operation states of the terminals utilizing data transmitted and received by wireless between the host controller and the terminals, and transmitting control commands of the host controller to the terminals to control the operation of the respective terminals.

It is another objective of the present invention to provide an automatic lubricating oil feeding system which can easily recognize the replacement timing of the terminals caused by the complete vanishing of the lubricating oil, and thus provide convenience in managing the machine elements by centralistically controlling the oil discharge operation of the terminals and checking the residual quantity of oil in the terminals.

It is yet another objective of the present invention to provide an automatic lubricating oil feeding system which can centralistically determine the operation modes of the respective terminals without the necessity of mode determination on the spot one by one.

It is a further objective of the present invention to provide an automatic lubricating oil feeding system which can centralistically identify the necessity of the maintenance and repair of the respective terminals by self-detecting the damage or the disabled state of the terminals due to the voltage drop of a built-in battery and transmitting the detected data to the host controller.

In order to achieve the above objectives, there is provided an automatic lubricating oil feeding system provided, which includes a host controller having a central computer, and a plurality of terminals each of which has a mechanical unit for discharging lubricating oil and a control device for driving the mechanical unit. A radio communication network is provided between the host controller and the terminals as subscribers. The central computer is programmed to supervise, check, and display the operation state of the respective terminals, and to transmit control commands to the terminals. The host controller as well as each terminal is provided with a radio frequency (RF) driver which is an RF transmitting/receiving device for encoding and transmitting the data corresponding to the control commands and the results of control, and for receiving and decoding the data.

The host controller initializes the respective subscribed terminals, controls the operational modes of the terminals, and checks and displays the state information of the terminals.

Each terminal operates to discharge the lubricating oil to the corresponding machine element in accordance with a determined operation mode, detects the disabled state of its oil discharge such as an overload of an oil feeding motor, shortage of the lubricating oil contained, voltage drop of a power supply, etc., and transmits the detected disabled state information to the host controller.

BRIEF DESCRIPTION OF THE DRAWINGS

The above objects, other features and advantages of the present invention will become more apparent by describing the preferred embodiment thereof with reference to the accompanying drawings, in which.

DETAILED DESCRIPTION OF THE PREFERRED EMBODIMENT

Figure 1:
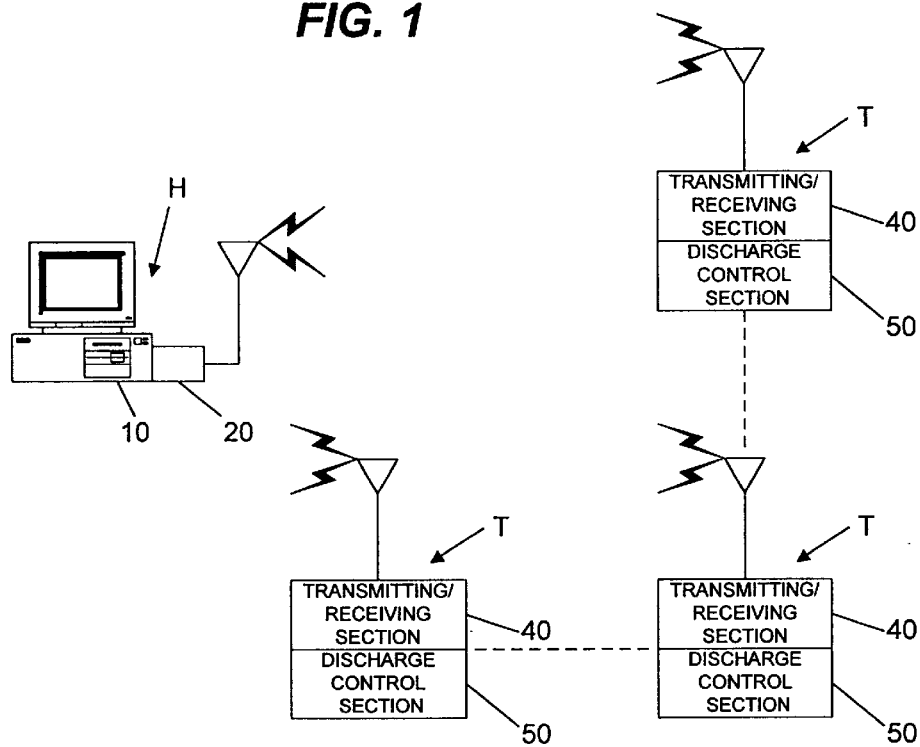
FIG. 1 is a block diagram conceptionally illustrating the automatic lubricating oil feeding system according to the present invention.

Referring to FIGS. 1 to 4, the automatic lubricating oil feeding system according to the present invention includes a host controller H comprising a personal computer 10 programmed to supervise, check, and display terminal state information, and an RF transmitting/receiving section 20, coupled to the personal computer via an interface 11, for transmitting command data of the personal computer and receiving the terminal state information data through a radio communication network; and at least one terminal T comprising a lubricating oil discharge control device 50 having a mechanical unit for discharging lubricating oil, a microprocessor MPU for controlling the operation of the mechanical unit, and an RF transmitting/receiving section 40, coupled to the lubricating oil discharge control device, for receiving from the host controller the command data for controlling the lubricating oil discharge control device and transmitting to the host controller the terminal state information data resulting from a self-test of the lubricating oil discharge control device through the radio communication network.

It is preferable that a plurality of terminals T, for instance, about 240 terminals, may join the host controller H as subscribers through the radio communication network utilizing identification codes.

The personal computer 10 in the host controller H is programmed to initialize by wireless the lubricating oil discharge control device 50 of the terminal, to demand the state information from the device, to stop for a predetermined time or to restart the operation of the device, to display the state information of the device, to collect the state information of the device at predetermined intervals, and to stop the operation of the device in accordance with a determined operation mode of the device.

The personal computer 10 produces data for performing the above-described functions, and the produced data is outputted by RS232C communication protocol through a serial communication port of the personal computer 10.

The control demands produced from the personal computer are transmitted through the interface 11 as RF signals.

Figure 2:
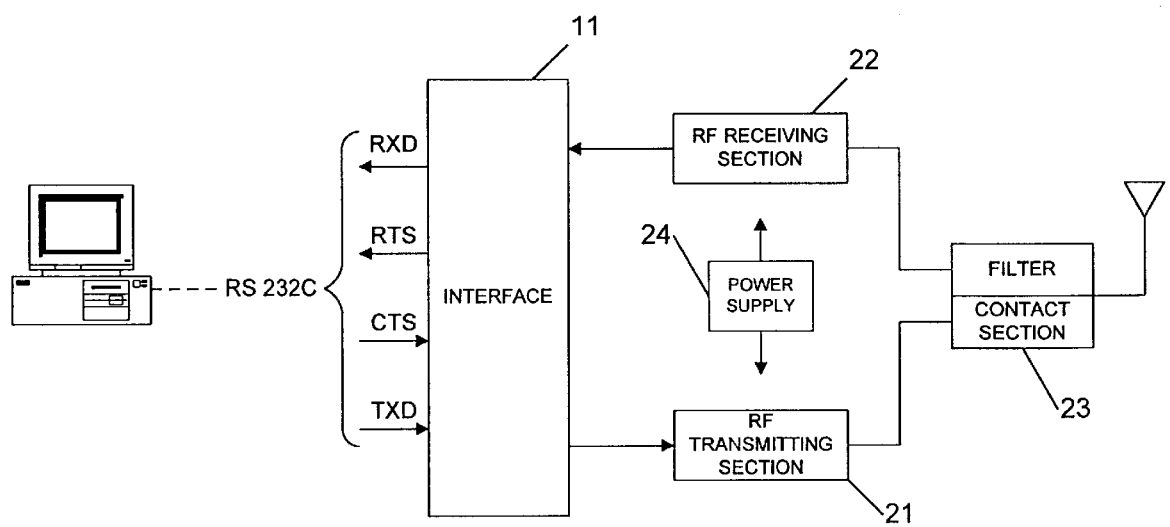
FIG. 2 is a block diagram illustrating the construction of the RF transmitting/receiving section in the host controller according to the preferred embodiment of the present invention.

Specifically, as in FIG. 2, the RF transmitting/receiving section 20 coupled to the personal computer via the interface 11 comprises an RF transmitting section 21, an RF receiving section 22, a contact section 23 for optionally switching on/off a transmission output path, and a power supply 24.

Meanwhile, the construction of the terminal which joins the host controller as the subscriber through the radio communication network will now be explained.

Figure 3:
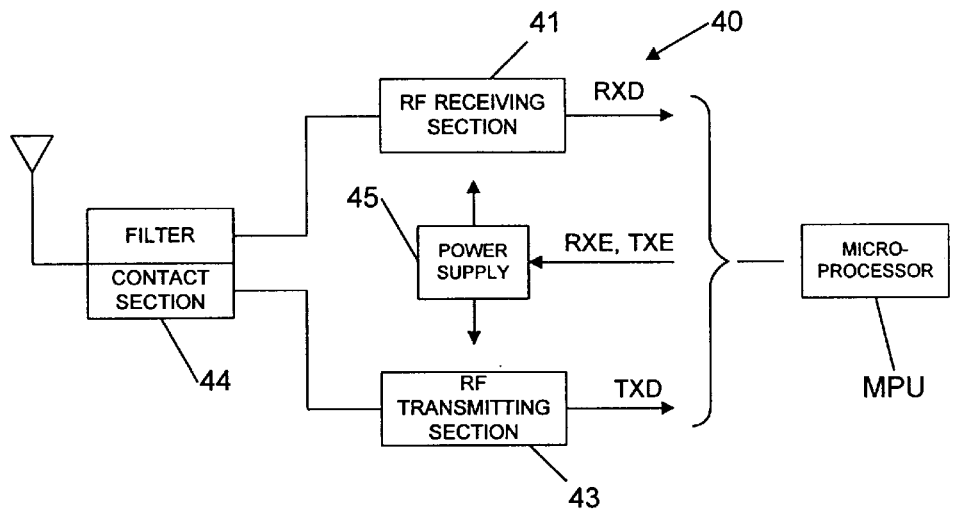
FIG. 3 is a block diagram illustrating the construction of the RF transmitting/receiving section in the terminal according to the present invention.
Figure 4:
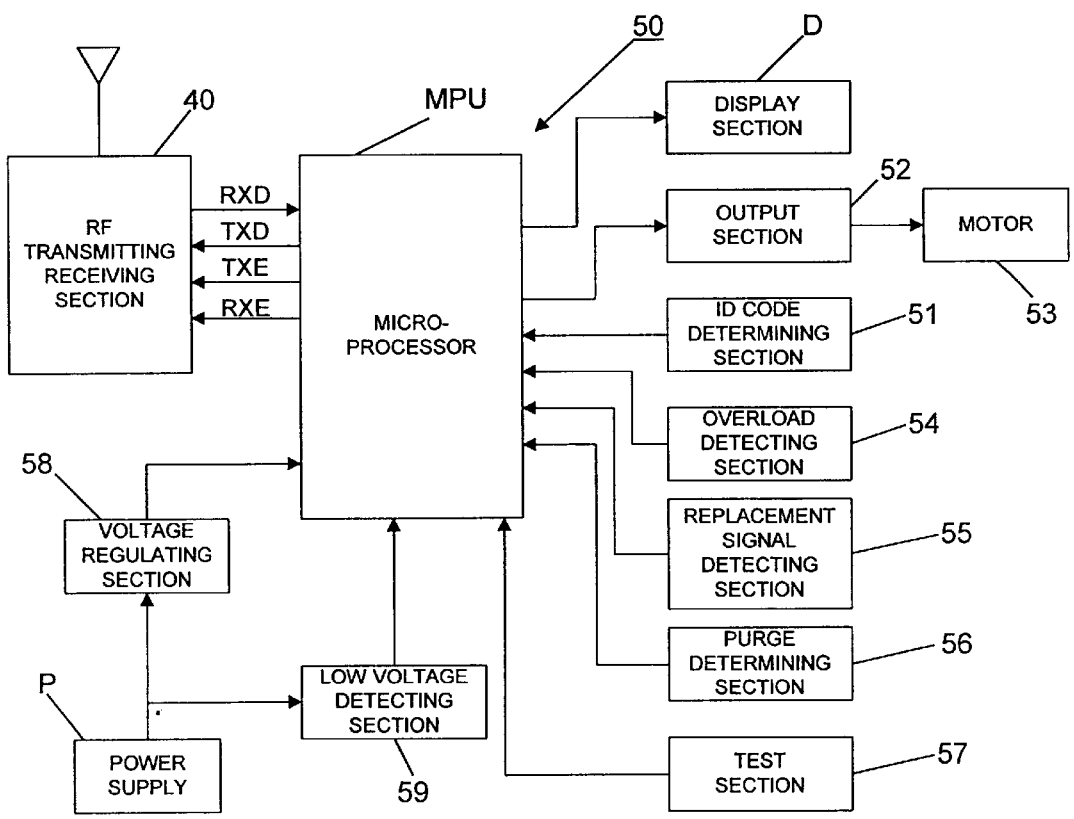
FIG. 4 is a block diagram of the control device for processing data from the RF transmitting/receiving section in the terminal and controlling the discharge of the lubricating oil according to the present invention.

Referring to FIG. 3, the RF transmitting/receiving section 40 in the terminal comprises an RF receiving section 41 for receiving and demodulating received control command data, a comparator 42 for waveform-shaping the demodulated data, an RF transmitting section 43, a contact section 44 for optionally switching on/off a transmission output path, and a power supply 45.

The RF transmitting/receiving section 40, which is connected to the microprocessor to process the transmitted and received data, transfers the control commands received from the host controller to the lubricating oil discharge control device, and transmits the state information of the lubricating oil discharge control device according to the demand of the host controller.

The lubricating oil discharge control device 50 includes the microprocessor MPU for determining a lubricating oil discharge mode in accordance with the control command of the host controller, controlling the lubricating oil discharge in accordance with the determined mode, determining a purge state for performing a tentative oil discharge and completely discharging residual oil, and performing self-tests for checking an abnormal oil discharge state, a voltage drop of the power supply, etc.

The lubricating oil discharge control device 50 also includes an identification (ID) code determining section 51, composed of a dual-in-package (DIP) switch, for determining an ID code (address) of the terminal, a lubricating oil discharge section 52 for driving a lubricating oil discharge motor 53 under the control of the microprocessor MPU, an overload detecting section 54 for detecting an overload of the motor, a replacement signal detecting section 55 for detecting vanishing of the lubricating oil, a purge determining section 56, a test section 57, a power supply P, a voltage regulating section 58 for providing a regulated voltage to the microprocessor, and a low voltage detecting section 59 for detecting the voltage drop of the power supply. The lubricating oil discharge control device 50 also includes a display section D, composed of light-emitting diodes (LEDs), for displaying the control operation of the microprocessor.

As described above, the host control H includes the personal computer 10, and the RF transmitting/receiving section 20, connected to the personal computer through the serial communication port, for transmitting the control commands of the computer and receiving the state information of the terminal.

The terminal T, which joins the host controller as a subscriber through the radio communication network and which is attached to a machine element such as a bearing to feed lubricating oil thereto, is composed of a single unit comprising the lubricating oil, the mechanical unit for discharging the lubricating oil, the lubricating oil discharge control device 50 for controlling the operation of the mechanical unit, and the RF transmitting/receiving section 40 for connecting by wireless the control device to the host controller.

The kind of lubricating oil and the structure of the mechanical unit for electrically discharging the lubricating oil are not specifically limited in the specification since any type of mechanical units which are electrically controlled can be applied to the present invention in accordance with the required characteristics.

In the embodiment of the present invention, the mechanical unit for discharging the lubricating oil employs a motor to provide its driving force.

Referring to the lubricating oil feeding system according to the present invention, the host controller can centralistically control and supervise the respective terminals by transmitting the control commands to the terminals and receiving the state information as a result of those controls and the results of self-test from the terminals, through the radio communication network.

Now the operation of the lubricating oil feeding system according to the present invention as constructed above will be explained in detail.

The host controller H as a central controller identifies the respective terminals T, and displays the state information of the respective terminals by the selection of a user. The user program for identifying the terminals, collecting, and displaying the controlled states thereof may be diversely provided by one skilled in the art.

Each terminal modulates the binary code type data of the self-test results, etc., into an RF signal and transmits the RF signal to the host controller.

Figure 5A:
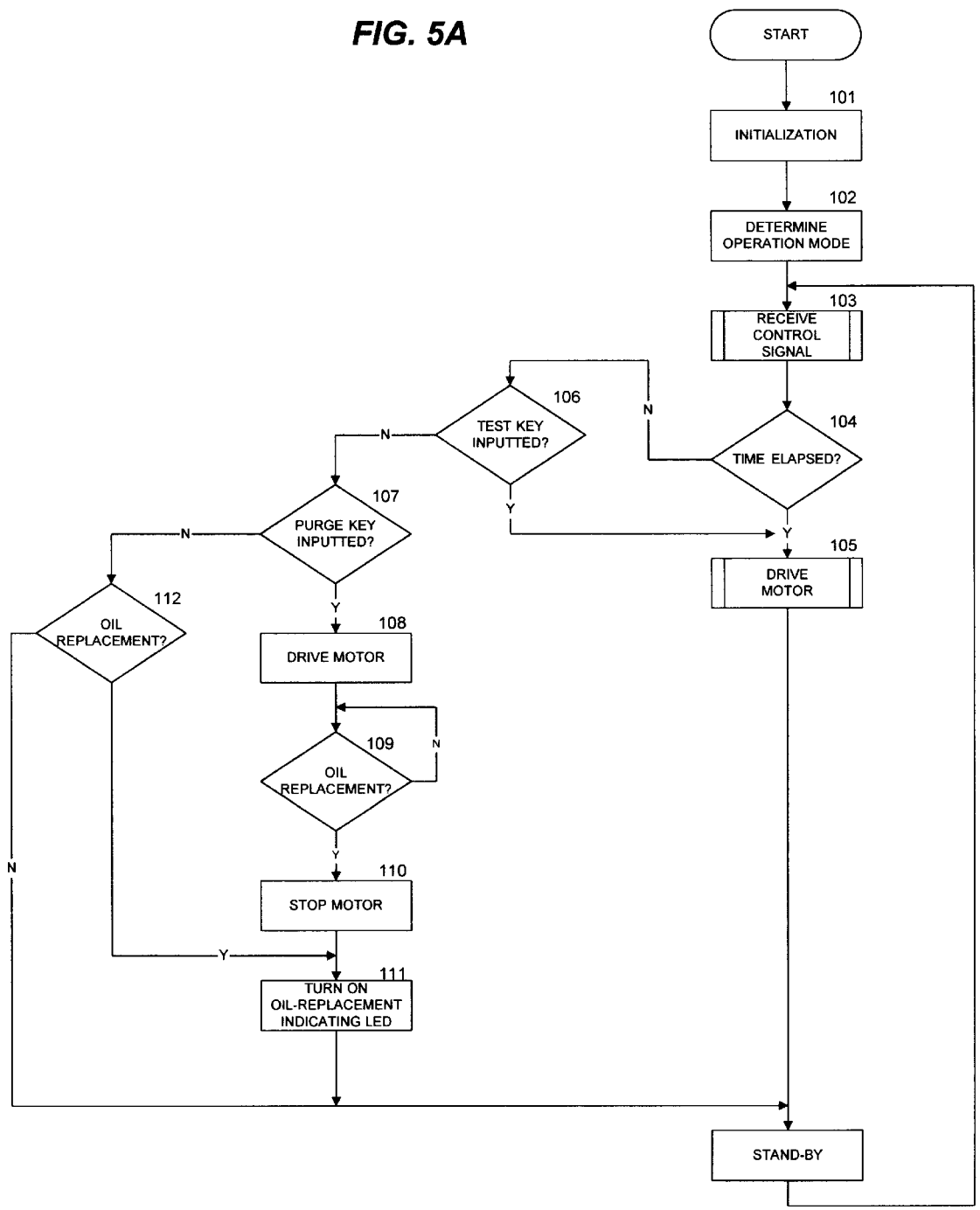
FIGS. 5A to 5C are flowcharts explaining the data processing procedure performed by the device of FIG. 4.
Figure 5B:
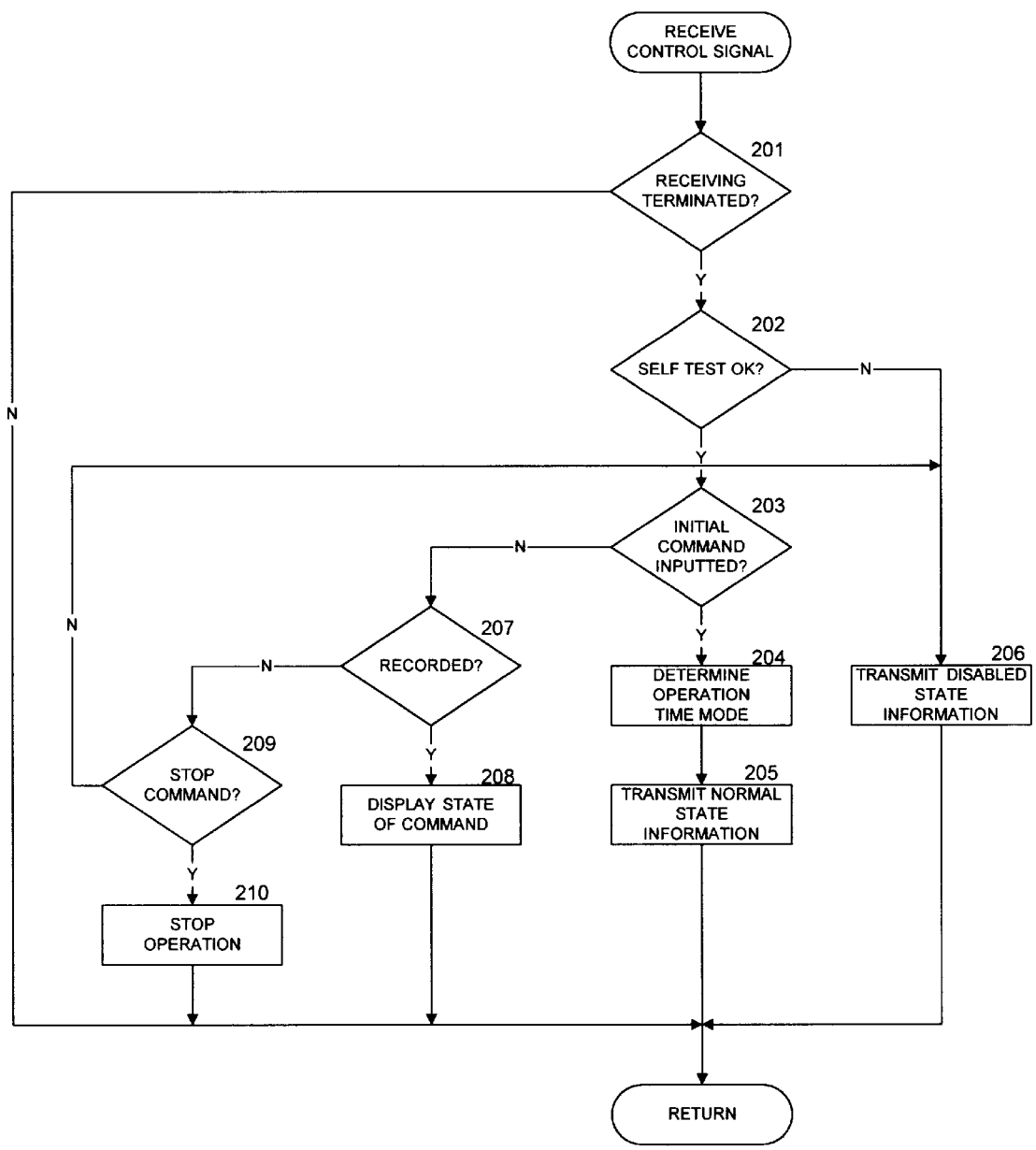
Figure 5C:
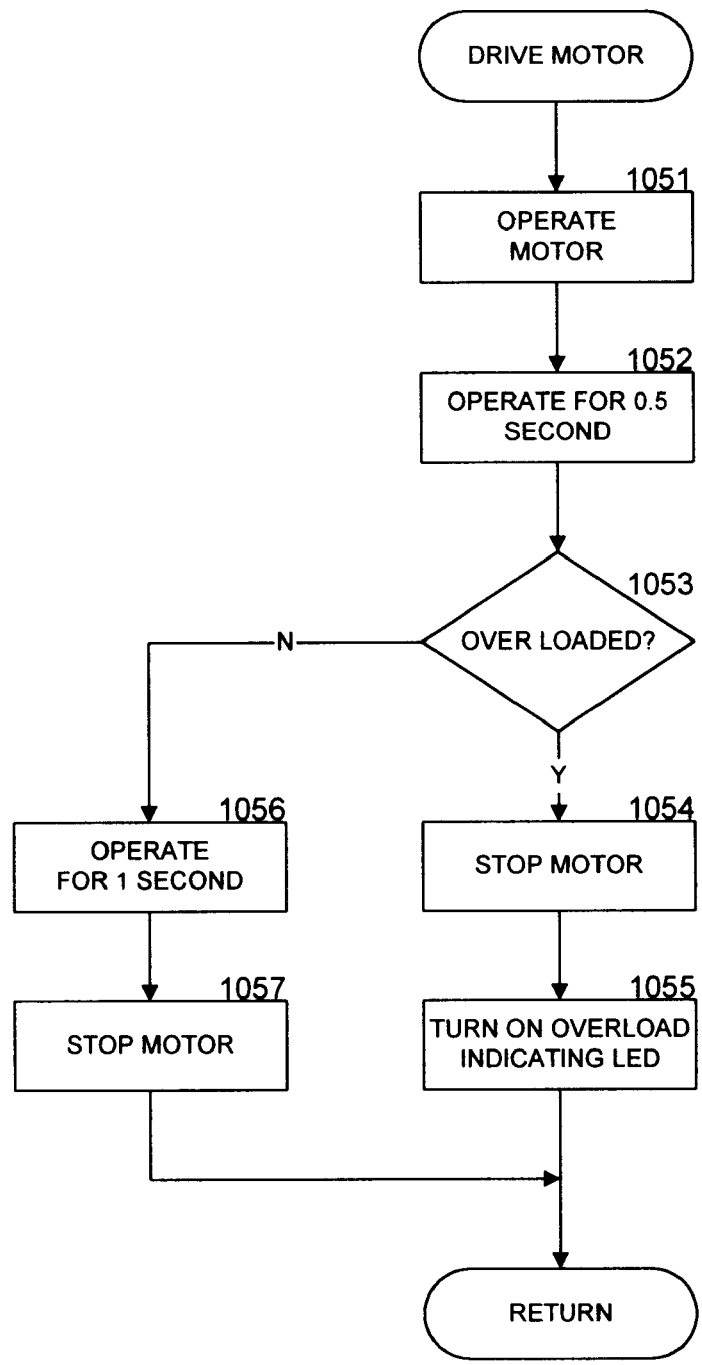

FIGS. 5A to 5C are flowcharts explaining the data processing performed by the terminal T under the control of the microprocessor MPU.

Referring to FIGS. 5A to 5C, the microprocessor MPU processes the transmitted/received data, and performs all the control of discharging the lubricating oil including the self-test control.

Specifically, the microprocessor determines the ID code of the terminal through the ID code determining section 51 comprising a DIP switch, and controls the power from the power supply P. The microprocessor, after being initialized by the host controller H (step 101), determines the operation mode of the terminal either manually (step 102) or by the host controller as described later. The operation mode (i.e., discharge mode) may be a 1-month mode, 2- or 3-month mode, 6-month mode, or 12-month mode, which is determined through a mode determining switch.

If the microprocessor receives the control signal from the host controller (step 103), it is interrupted and detects the termination of the data reception (step 201) as shown in FIG. 5B. At this time, if the data reception terminates, the microprocessor checks whether or not the self-test result is normal (step 202). If it is normal, the microprocessor analyzes the received data. If the received data refers to an initial command (step 203), the microprocessor determines the corresponding operation mode (step 204), and transmits the state information data acknowledging that the control command has been executed to the host controller through the RF transmitting section 40 (step 205). Step 204 refers to the mode determination by the host controller, not by the above-described manual mode determination at step 102.

If the self-test result is checked as abnormal at step 202, such as the voltage drop of the power supply, overload of the motor, shortage of the lubricating oil contained in the terminal, etc., the microprocessor transmits the corresponding error signal to the host controller (step 206).

Meanwhile, if the received data does not refer to the initial command at step 203, the microprocessor records the received data (step 207), and displays the state of the received data (step 208). If the data received from the host controller refers to a stop command (step 209), the microprocessor stops the operation of the terminal (step 210). If the received data refers neither to the initial command nor the stop command as a result of analysis, the microprocessor considers this as a reception failure, and transmits the corresponding information to the host controller (step 206) to return to the initial step. In this case, retransmission of the data will be performed by the host controller.

The microprocessor performs a time count in accordance with the determined operation mode, and if the time determined corresponding to the operation mode elapses (step 104), it outputs a drive signal to the output section 52, so that the motor 53 operates for a predetermined time, i.e., for about 1.5 seconds to discharge the lubricating oil (step 105).

Meanwhile, the user may manually enter a test key or a purge key before the predetermined time for the corresponding operation mode to elapse. If the test key is entered (step 106), the microprocessor performs the tentative lubricating oil discharge operation as at step 105, while if the purge key is inputted through the purge determining section 56 (step 107), the microprocessor operates the motor to discharge the lubricating oil (step 108).

In such a purge mode, the operation of the motor continues until the lubricating oil vanishes completely, so that the residual oil can vanish completely before replacing the terminal.

When the residual lubricating oil has vanished completely and the replacement signal detecting section 55 outputs a corresponding detection signal, the microprocessor recognizes this (step 109), and thus stops the motor (step 110) as well as turning on the LED in the display section D, indicating that the terminal is to be replaced (step 111).

Also, when the vanishing of lubricating oil in a normal operation mode is detected (step 112), the microprocessor turns on the terminal replacement indicating LED in the display section (step 111). Thereafter, the microprocessor transmits such resultant information to the host controller through the control at steps 202 and 206.

Meanwhile, the operation of the motor (step 105) will be explained in detail with reference to FIG. 5C.

When 0.5 of a second elapses (steps 1052) after the motor starts its operation (step 1051), the microprocessor detects whether the motor is overloaded (step 1053). If it is detected that the motor is overloaded, the microprocessor stops the motor (step 1054), and turns on the overload indicating LED 1055 in the display section D. If it is detected that the motor is not overloaded, the microprocessor maintains the operation of the motor for further 1.5 seconds (step 1056), and then stops the motor (step 1057) to perform the lubricating oil discharge operation for 1.5 seconds in the normal operation mode.

The motor driving time of 1.5 seconds is necessary and sufficient to discharge 0.174 cc of the lubricating oil, which is the discharged amount of lubricating oil at a time. According to the present invention, the operation mode is determined in accordance with the required amount of lubricating oil in the machine element where the terminal is attached, and the total discharge amount of lubricating oil per unit time is varied in accordance with the determined operation mode.

The relationship between the operation mode and the discharge of lubricating oil is shown in a following table.

TABLE

| | | | | | |
|---|---|---|---|---|---|
| OPERATION MODE [MONTH] | 1 | 2 | 3 | 6 | 12 |
| DISCHARGE TIME INTERVAL [hour] | 1 | 2 | 3 | 6 | 12 |
| DISCHARGE AMOUNT PER DAY [cc] | 8.3 | 4.2 | 2.8 | 1.4 | 0.7 |
| DISCHARGE AMOUNT AT A TIME [cc] | 0.174 | 0.174 | 0.174 | 0.174 | 0.174 |

As shown in the table, all the operation modes have the same amount of oil discharged at a time, but have different intervals of discharge time.

From the foregoing, it will be apparent that the present invention provides the advantages that it can centralistically control a plurality of terminals having lubricating oil feeding units which are distributed in a large area by providing a radio communication network between a host controller as a central controller and the terminals as subscribers, supervising the operation states of the terminals utilizing data transmitted and received by wireless between the host controller and the terminals, and transmitting a control command of the host controller to the terminals to control the operation of the respective terminals, thereby enabling the continuous feeding of the lubricating oil with the operating states of all the terminals checked obviously. Further, according to the present invention, the replacement timing of the terminals which is caused by the complete vanishing of the oil can be easily recognized, providing convenience in managing the machine elements, by centralistically controlling the oil discharge operation and the residual quantity of oil in the respective terminals. Also, the operation modes of the respective terminals can be centralistically determined without the necessity of the manual mode determination on the spot, one by one. Furthermore, the necessity of the maintenance and repair of the respective terminals can be centralistically identified by self-detecting the damage or the disabled state of the terminals and transmitting the detected data to the host controller.

While the present invention has been described and illustrated herein with reference to the preferred embodiment thereof, it will be understood by those skilled in the art that various changes in form and details may be made therein without departing from the spirit and scope of the invention.

What is claimed is:

1. An automatic lubricating oil feeding system capable of centralized control, comprising:

a host controller comprising a personal computer programmed to supervise, check, and display terminal state information, and an RF section, coupled to the personal computer via an interface, for transmitting command data of the personal computer and receiving the terminal state information data through a radio communication network; and at least one terminal capable of attachment to a machine element requiring lubricating oil and comprising a lubricating oil supply, a lubricating oil discharge control device in fluid communication with the machine element and having a mechanical unit for automatically discharging the lubricating oil directly to the machine element, a microprocessor for controlling operation of the mechanical unit, and an RF section, coupled to the lubricating oil discharge control device, for receiving from the host controller the command data for controlling the lubricating oil discharge control device and transmitting to the host controller the terminal state information data resulting from a self-test of the lubricating oil discharge control device through the radio communication network.

2. An automatic lubricating oil feeding system as claimed in claim 1, wherein the personal computer in the host controller is programmed to initialize by wireless the lubricating oil discharge control device of the terminal, to demand the terminal state information from the device, to stop for a predetermined time or to restart the operation of the device, to display the terminal state information of the device, to collect the terminal state information of the device at predetermined intervals, and to stop the operation of the device in accordance with a determined operation mode of the device.

3. An automatic lubricating oil feeding system as claimed in claim 1, wherein the RF section coupled to the personal computer via the interface comprises an RF transmitting section, an RF receiving section, a contract section for optionally switching on and off a transmission output path, and a power supply.

4. An automatic lubricating oil feeding system as claimed in claim 1, wherein the RF section in the terminal comprises an RF receiving section for receiving and demodulating received control command data, an RF transmitting section, a contact section for optionally switching on and off a transmission output path, and a power supply.

5. An automatic lubricating oil feeding system as claimed in claim 1, wherein the lubricating oil discharge control device comprises an identification (ID) code determining section for determining an ID code (address) of the terminal, a lubricating oil discharge section for driving a lubricating oil discharge motor under the control of the microprocessor, an overload detecting section for detecting an overload of the motor, a replacement signal detecting section for detecting vanishing of the lubricating oil, a purge determining section, a test section, a power supply, a voltage regulating section for providing a regulated voltage to the microprocessor, and a low voltage detecting section for detecting the voltage drop of the power supply.

6. An automatic lubricating oil feeding system as claimed in claim 1, wherein the microprocessor in the terminal is programmed to determine a lubricating oil discharge mode in accordance with the control command of the host controller, control the lubricating oil discharge in accordance with the determined mode, determine a purge state for performing a tentative oil discharge and completely discharging the residual oil, and perform self-tests for checking an abnormal oil discharge state, a voltage drop of the power supply, etc.

\* \* \* \* \*